M. SZAX.
AUTOMATIC SHEARING DEVICE.
APPLICATION FILED MAY 18, 1908.

909,476.

Patented Jan. 12, 1909.

Witnesses.

Inventor:
Mathias Szax,
by Edward Hopkins
Attorney

UNITED STATES PATENT OFFICE.

MATHIAS SZAX, OF BUDAPEST, AUSTRIA-HUNGARY, ASSIGNOR OF ONE-HALF TO ADAM KRISZTMANN, OF BUDAPEST, AUSTRIA-HUNGARY.

AUTOMATIC SHEARING DEVICE.

No. 909,476.      Specification of Letters Patent.      Patented Jan. 12, 1909.

Application filed May 18, 1908. Serial No. 433,518.

*To all whom it may concern:*

Be it known that I, MATHIAS SZAX, a citizen of the Kingdom of Hungary, and a resident of Budapest, Austria-Hungary, have invented a new and useful Improvement in Automatic Shearing Devices, of which the following is a full, clear, and exact description.

The present invention consists of an automatic shearing device for use both for shearing animals or for cutting hair.

The invention relates to that class of shearing devices in which two cutters are employed, having a reciprocatory movement one on the other, and the object of the invention is to provide mechanical means for moving a movable cutter on a stationary one, as hereinafter particularly set forth.

In order to render the present specification easily intelligible reference is had to the accompanying drawing in which similar numerals of reference denote similar parts throughout the several views.

Figure 1:
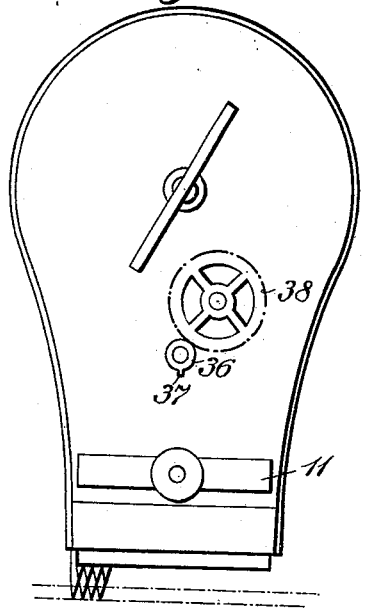
Figure 3:
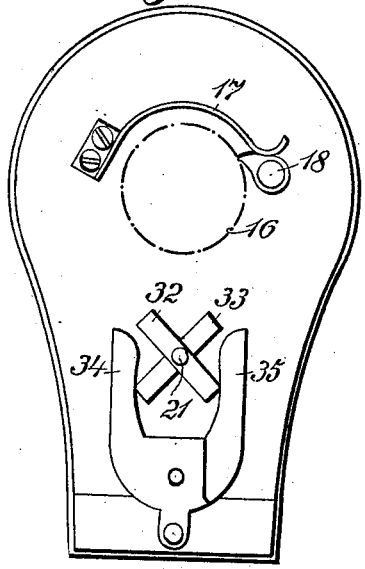
Figure 2:
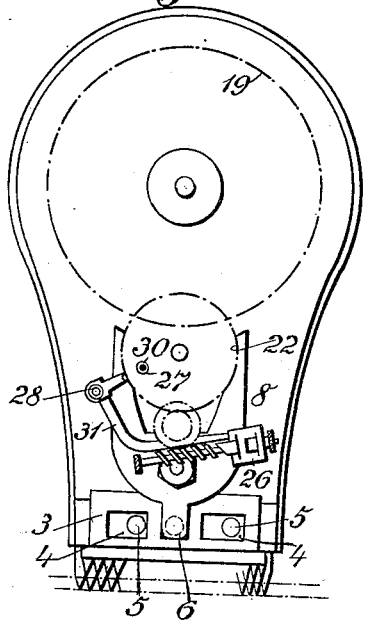
Figure 4:
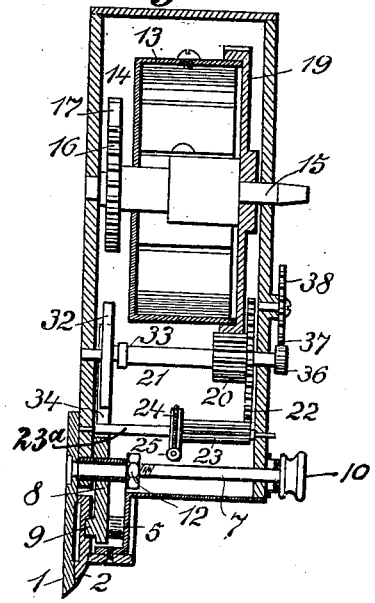

Figure 1 is a plan view of the device, Fig. 2 a view seen from underneath with the lower housing cover removed, Fig. 3 a plan view with the top cover removed, and Fig. 4 a central longitudinal section through the apparatus.

The stationary cutter 1 is fixed to the bottom of the housing by means of a rivet pin 7 extending up through the cover and having a nut 10 and intermediate flat spring 11 to form a slightly yielding attachment. The movable cutter 2 extends out of the front part of the housing and is guided by means of slots 4, 4 and pins 5, 5. In a central slot 6 of the said cutter a pin 9 engages, said pin being carried by a lever 8, adapted to rock on the rivet pin 7 and having its rear end bifurcated (Fig. 3). A spindle 21 is supported in the housing and carries at its lower end a pair of cross arms 32 and 33 (Figs. 3 and 4) each arm lying in a different plane. The two shanks 34 and 35 of the bifurcated lever 8 also lie in different planes, so that the shank 35 will be engaged by the cross arm 32 and the shank 34 by the arm 33. The ends of the shanks are shaped cam-like to enable ready engagement with the arms. Obviously when the spindle 21 is rotated, the arms 32 and 33 will coöperate with the lever 8 to rock it on its pivot 7, and thus its forward end being coupled to the movable cutter 2, will reciprocate the same on the stationary cutter 1.

The spindle 21 is rotated by suitable mechanical means and in the present instance a clockwork is illustrated, but other suitable mechanical driving means might be employed. The clockwork consists of the spring housing 13 having the mainspring 14 therein, one end of which is attached to the housing and the other to the spindle 15. The housing is provided with a gear 19 forming one cover of the same and the spindle 15 is provided with the usual ratchet wheel 16 and spring pawl 17, 18 (Fig. 3). The gear 19 engages a gear 20 or pinion of the spindle 21, said pinion carrying a second gear 22, engaging a pinion 23 of a spindle 23$^a$, said pinion carrying a wormwheel 24 engaging a worm 27 carrying the usual wing regulator 26 for the clockwork. In order to retain the clockwork out of operation, an arm 29 is provided having at its end an upwardly turned pin 30 adapted to engage in a hole 27 of the gear 22, said arm 29 having a curved branch arm 31 adapted to engage under and stop the wind regulator. The two arms are vertically movable on a spindle 28 and may advantageously be normally pressed upwardly against the under side of the gear by means of a spring (not shown) any suitable means being provided to keep them down out of engagement when the clockwork is to be kept running. A vertical pin may extend out of the housing by which the said arm 29, 31 may be depressed as will be readily understood. In order to show the state of tension of the main spring, *i. e.* how far the same is run down, the spindle 21 is extended through the top of the housing and carries a pinion 36 having but one tooth 37 which engages at each revolution in a gear 38 which may be provided with a scale on its surface to show the position of the main spring.

The details of construction of the apparatus might be varied in many ways without departing from the main idea of the invention.

I claim as my invention:—

In a shearing device comprising a housing, a stationary cutter mounted thereon, a reciprocating cutter to reciprocate over said stationary cutter, the combination of a lever pivotally supported in said housing and having one end attached to the said movable cutter and the other end bifurcated, the shanks of the said bifurcation lying in superposed planes, a pair of crossed arms and a rotary spindle mounted in the said housing, the said arms being attached to said spindle in superposed planes corresponding, one to each of the shanks of the said bifurcation and mechanical means for rotating the said cross arms substantially as described.

In testimony whereof I affix my signature in the presence of two witnesses.

MATHIAS SZAX.

Witnesses:
JOSEPH WIEKMANN,
MICHAEL TOÏNÓR.